March 4, 1941.  C. B. MOORE  2,234,056
SEPARABLE SOCKET
Filed March 4, 1938

INVENTOR.
COLEMAN B. MOORE
BY George M. Munschamp
ATTORNEY

Patented Mar. 4, 1941

2,234,056

UNITED STATES PATENT OFFICE 2,234,056

SEPARABLE SOCKET

Coleman B. Moore, Carroll Park, Pa., assignor to The Brown Instrument Company, Philadelphia, Pa., a corporation of Pennsylvania Application March 4, 1938, Serial No. 193,933

6 Claims. (Cl. 297—3)

The present invention relates to sockets for holding thermometer bulbs, thermocouples and the like in place in a tank or other container, in which the bulb is placed for the purpose of measuring the temperature thereof.

In measuring the temperature of an enclosure with a thermometer of the type in which the reading is taken at some distant point, it is customary to insert a bulb containing a temperature responsive medium into the enclosure or recording device. Some type of socket is needed to hold the bulb in place in the enclosure in such a manner that the bulb may be removed if necessary. If the interior of the enclosure is under a pressure or a vacuum, or the socket is located in a vertical wall or bottom of a liquid tank, it is usual to employ a closed socket or recess. Such known sockets being closed and usually formed of relatively heavy material for durability introduce time lag of response between the time a temperature change occurs in the enclosure and the time that change is transmitted to the temperature sensitive bulb because of the thickness of the socket and the dead air space between the socket and the bulb. Such a lag or sluggish response is highly undesirable especially when the temperature sensitive element is employed to actuate a control device in connection with which a lag would contribute to undesirable fluctuations in the condition to be controlled.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

Figure 1:
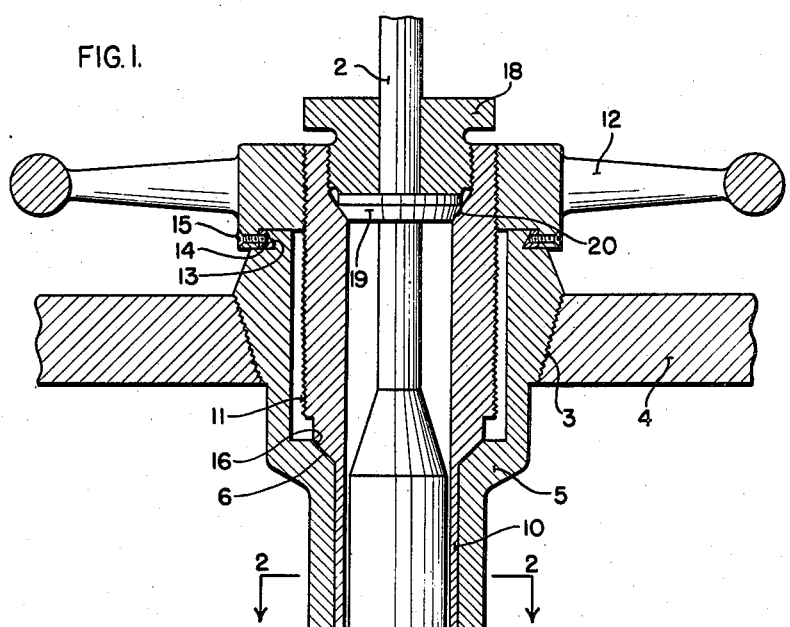
Figure 2:
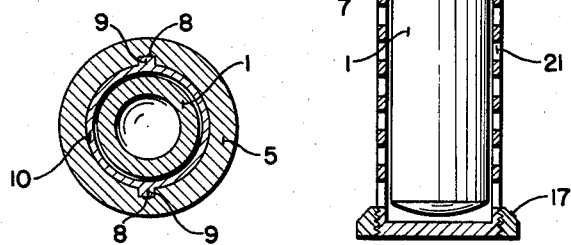

In the drawing:
Fig. 1 is a sectional view of the bulb socket; and
Fig. 2 is a sectional view taken on line 2—2 of Fig. 1.

Referring to Fig. 1, the reference numeral 1 designates a thermometer bulb which contains a temperature responsive medium whose variations are transferred through a tube 2 to some suitable type of indicating, recording, or controlling mechanism. This bulb is inserted in a container through an opening 3 in a side 4 thereof. The bulb is held in place in the opening by a socket now to be described.

An outer sleeve 5 of the socket is threaded tightly into the opening 3 and is formed with an inner seat 6 and an outer seat 7 at each end of a cylindrical extension thereof. A pair of keyways 8 of less depth than the radial dimension of the seats are formed within the cylindrical extension to snugly receive a pair of keys 9 formed upon the exterior of a member 10 received therein. This member 10 fits snugly within the cylindrical extension of the outer sleeve 5 and is held in adjusted axial positions by cooperation between screw threads 11 formed upon its upper end and screw threads upon the interior of a handwheel 12 which is rotatably mounted on an extension of the sleeve 5. The sleeve 5 is undercut as at 13 and has a ring 14 of complementary form placed therein. A flange on the handwheel is secured to the ring 14 by screws 15, so that as the handwheel is rotated in one direction or the other, the member 10 will be adjusted axially.

The member 10 is formed as a cup and has on its exterior a pair of seats 16 and 17 adapted to cooperate with seats 6 and 7 respectively. It is noted that the seat 17 is made separate from the tube 10 and is secured thereto by a threaded connection. This is necessary in order that the tube 10 may be inserted into and removed from the outer sleeve 5. The bulb 1 is placed within the member 10 and held therein by a plug 18 that is threaded within the upper end of member 10 against a disc 19 rigidly attached to tube 2. The disc 19 has on its lower side a bevel edge that is tightly pressed against a corresponding edge 20 formed within member 10, thereby holding the bulb rigidly in place. Perforations 21 are provided in the lower end of member 10 so that the bulb may be in intimate contact with the interior of the enclosure and thereby increase the heat transfer to the bulb.

In order to remove the bulb from the enclosure, handwheel 12 is first rotated in a direction to withdraw member 10 until seat 17 is drawn up tightly against seat 7. The keys 9 prevent rotation of member 10 during this operation. After the seat 17 is drawn tightly against seat 7, the plug 18 is removed, and the bulb 1 can be readily lifted out to be inspected or changed as desired. To replace the bulb, plug 18 is first screwed in member 10 until disc 19 fits tightly against seat 20, then the handwheel 12 is rotated in the opposite direction until seat 16 is forced against seat 6. From the above operation, it will be seen that at no time is the interior of the enclosure exposed to the atmosphere, and thus, any pressure that may be in the enclosure is not released by the removal of the bulb. It will also be seen that while in the enclosure, the bulb, because of perforations 21, is in intimate contact with medium whose temperature is to be measured.

In accordance with the patent statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is.

1. In combination with a bulb socket, a container having an opening therein, a sleeve having an axial bore fitted within said opening, a member adapted to receive a thermal element guided by and movable within the bore of said sleeve, means forming part of said member and sleeve to form a plurality of separate pressure tight connections therebetween, and means to move said member within said sleeve to alternately close said connections.

2. In combination with a bulb socket, a container having an opening therein, a sleeve fastened within said opening, said sleeve having a bore therethrough with seats at each end, a member adapted to receive a thermal element guided by and movable within said bore and having seats adapted to cooperate with the seats on said sleeve, and means to move said member in said sleeve to bring a seat on each part into cooperating relation.

3. In combination with a bulb socket, a container having an opening therein, a sleeve with an axial bore fastened in said opening, a cup-shaped member slidably received within said bore and having perforations in one end, a measuring element within said member extending opposite said perforations, means to fasten said element within said member, and means to move said member relative to said sleeve.

4. In combination with a bulb socket, a sleeve having an axial bore and a seat on each end thereof, a cup-shaped member adapted to receive a thermal element slidably received in said bore and having perforations in its side near the closed end, seats on said member adapted to cooperate with the seats on said sleeve, a handwheel axially fixed but rotatable with respect to said sleeve, cooperating means between said handwheel and member whereby rotation of said handwheel will axially move said member to bring one or the other of said pairs of seats into engagement.

5. In a thermometer bulb socket, a sleeve having an axial bore therein and a seat at each end of said bore, a perforated bulb receiving member slidable within said bore and having seats adapted to cooperate individually with the seats on said sleeve, cooperation of each pair of seats adapted to form a pressure tight connection, and means to move said member within said sleeve to bring one or the other of said pairs of seats into cooperating relation.

6. In a bulb socket, a cup shaped bulb receiving member provided with apertures along its side, means to fasten a bulb in said member in pressure tight relation thereto, a part adapted to slidably receive said member, and means adapted to slide said member in said part and removably hold said member in pressure tight relation to said part.

COLEMAN B. MOORE.